Patented Oct. 9, 1951

2,570,522

UNITED STATES PATENT OFFICE 2,570,522

NEW PYRENE CONDENSATION PRODUCTS AND THEIR MANUFACTURE

Eric Clar, Glasgow, Scotland, assignor to Petrocarbon Limited, London, England

No Drawing. Application July 31, 1950, Serial No. 176,920. In Great Britain August 16, 1949

12 Claims. (Cl. 260—517)

This invention relates to the manufacture by the interaction of pyrene and phthalic anhydride or derivatives thereof of new products, which are valuable intermediates in the production of vat dyestuffs or further intermediates.

The invention also relates to the production of such vat dyestuffs and further intermediates.

The condensation of one molecule of pyrene with one molecule of phthalic anhydride to form the monocarboxylic acid, namely mono-o-carboxybenzoylpyrene or pyrene monophthaloylic acid, or to form monophthaloylpyrene, is known—see J. W. Cook and L. C. Hewett, Chem. Soc. 1933, 400, and B. P. No. 366,472 respectively.

Further H. Vollmann, H. Becker, M. Correll and H. Streeck (Annalen der Chemie, 531, 128) have shown that diphthaloyl pyrene or a mixture of isomers of diphthaloyl pyrene can be obtained in small yields by heating pyrene with excess of phthalic anhydride in an aluminium chloride/sodium chloride melt at 150–160° C.

It has now been found that by heating pyrene with two or preferably more than two molecular proportions of phthalic anhydride in an inert solvent and in the presence of aluminium chloride at a temperature between 50 and 100° C., a mixture of isomers of the hitherto unknown dicarboxylic acids, namely di(ortho-carboxybenzoyl) pyrenes are obtained. It has also been found that these isomers can be separated owing to the different solubilities of their sodium salts in water and can be converted either singly or in admixture to the diphthaloyl pyrenes.

It has further been found that nuclear substituted derivatives of phthalic anhydride and particularly the halogen derivatives, can be used in this reaction to yield the correspondingly substituted di(ortho-carboxybenzoyl) pyrenes.

Thus the present invention consists in a process for the production of a di(ortho-carboxybenzoyl) pyrene by heating pyrene with two or preferably more than two molecular proportions of phthalic anhydride in an inert solvent and in the presence of aluminium chloride at a temperature between 50 and 100° C.

The invention also consists in a process for the production of derivatives of di(ortho-carboxybenzoyl) pyrene and particularly derivatives substituted in the benzene nuclei by halogens, by heating pyrene with two or preferably more than two molecular proportions of a nuclear substituted phthalic anhydride in an inert solvent and in the presence of aluminium chloride at a temperature between 50 and 100° C.

In the production of di(ortho-carboxybenzoyl) pyrene or derivatives thereof in accordance with the invention the heating preferably takes place at a temperature between 65 and 85° C. and the reactants are preferably maintained at the temperature of heating for about one hour in order to obtain a satisfactory yield of the desired product. The amount of aluminium chloride used is preferably in excess of the amount theoretically required.

Tetrachloroethane or trichlorobenzene may be used with advantage as the inert solvent which must not react with either of the reactants.

The dicarboxylic acids yielded by the reaction of pyrene with phthalic anhydride in accordance with the process of the invention are the following:

I 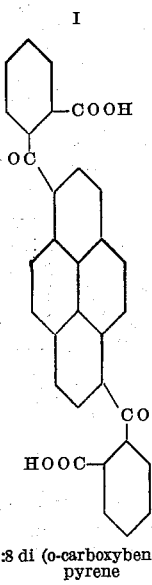   II 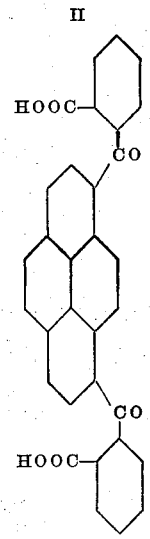

3:8 di (o-carboxybenzoyl) pyrene    3:10 di (o-carboxybenxoyl) pyrene

These two acids can be separated owing to the different solubilities of their sodium salts and can be subjected to ring closure by treatment with acid condensing agents to yield respectively the diquinones.

III 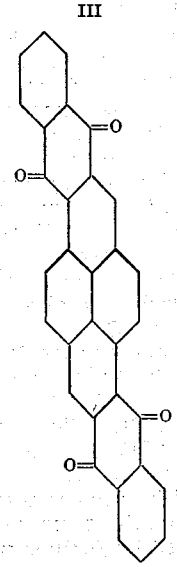   IV 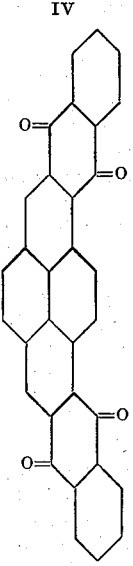

3:4-8:9 diphthaloylpyrene    3:4-9:10 diphthaloylpyrene

The diquinones are themselves known vat dyestuffs, but may also be used in known fashion for the preparation of other vat dyestuffs.

The invention also consists in the production of pyrene by heating pyrene with two or preferably more than two molecular proportions of phthalic anhydride in an inert solvent and in the presence of aluminium chloride at 50 to 100° C. to yield a di(ortho-carboxybenzoyl) pyrene and treating the product with an acid condensing agent to effect ring closure.

The invention also consists in the production of derivatives of diphthaloyl pyrene and particularly derivatives substituted in the benzene nuclei by halogens, by heating pyrene with two or preferably more than two molecular proportions of a nuclear substituted phthalic anhydride in an inert solvent and in the presence of aluminium chloride at 50 to 100° C. to yield a derivative of di(ortho-carboxybenzoyl) pyrene and treating the product with an acid condensing agent to effect ring closure.

The invention also consists in the new products consisting of di(ortho-carboxybenzoyl) pyrene and derivatives thereof substituted in the benzene nuclei.

The invention also consists in the processes and new products described below.

The invention has the important advantage in that it provides a process whereby the new products, namely di(ortho-carboxybenzoyl) pyrenes and derivatives thereof, can be produced in substantial yields and can separately or in admixture be used to produce valuable vat dyestuffs or intermediates therefor. By its means a substantial yield of a pure isomer of diphthaloyl pyrene or of a mixture of isomers can be obtained.

Following are examples of processes carried out in accordance with the invention:

Example 1

40 parts by weight of pyrene and 70 parts by weight of phthalic anhydride were melted together and 210 parts by weight of tetrachloroethane were poured into the liquid. 130 parts by weight of powdered aluminium chloride were gradually added at 50° C. and the mixture was then heated for 1 hour at 70° C. After decomposition with dilute hydrochloric acid, the tetrachloroethane was removed by steam distillation. The residue was washed with water, dissolved in hot dilute sodium hydroxide solution and filtered. The mixture of dicarboxylic acids was precipitated out of this solution with hydrochloric acid. Monocarboxylic acid present was removed by washing with hot acetic acid in which the dicarboxylic acids are only slightly soluble.

The 3:10 di(ortho-carboxybenzoyl) pyrene (II) was isolated in the form of its sodium salt by crystallisation from dilute aqueous sodium hydroxide. The free acid obtained from the sodium salt by acidification crystallised from 1-methyl naphthalene in the form of yellow needles which melt with decomposition at 325° C.

Acidification of the alkaline mother liquors left after crystallisation of the 3:10 compound yielded the 3:8 dicarboxylic acid (I) which may not be altogether free of the 3:10 dicarboxylic acid. Recrystallisation of the latter from nitrobenzene gave pale yellow crystals with a melting point of 305–310° C. (with decomposition). These crystals may still contain some of the isomer which may be removed by further treatment or after condensation as described below.

The dicarboxylic acids I and II can be converted to the diquinones III and IV respectively by heating for ½ hour at 150° C. with ten times the quantity of concentrated sulphuric acid or by boiling with benzoyl chloride together with a trace of sulphuric acid.

Thus 5 gms. of the dicarboxylic acid I were boiled for ½ hour with 15 gms. of benzoyl chloride and two drops of concentrated sulphuric acid in 150 ccs. of nitrobenzene. A thick mass of orange crystals precipitated from the hot liquid and was filtered off at 100° C. and was washed with nitrobenzene and ether. Recrystallisation from nitrobenzene gave orange needles of 3:4–8:9 diphthaloylpyrene which sintered at 450° C. and charred without melting at higher temperatures.

The pure diquinone is not soluble in cold concentrated sulphuric acid, and an occasionally green solution obtained by treatment with this acid indicates the presence of the isomeric diquinone which can be removed by filtering through a porous filter plate.

3:4–9:10 diphthaloylpyrene was similarly prepared from the dicarboxylic acid II. It formed orange needles, M. P. 450–455° C., which dissolved in concentrated sulphuric acid with a pure green colour. Both diquinones gave a brownish vat in alkaline sodium hydrosulphite. Instead of separating the two carboxylic acids I and II, the mixture after washing with hot acetic acid may be treated with an acid condensing agent as described above to yield a mixture of the diquinones III and IV.

Example 2

70 parts by weight of phthalic anhydride and 130 parts by weight of powdered aluminium chloride were heated in 320 parts by weight of trichlorobenzene to 70° C. during which 40 parts by weight of pyrene were gradually added. The mixture was heated for one hour at 80° C. and decomposed with cold dilute hydrochloric acid. The solvent was then driven off with steam and the residue dissolved in dilute sodium hydroxide solution and filtered. Hydrochloric acid was added to the hot solution. The precipitate was washed with water and treated with 500 parts by weight of boiling acetic acid to remove any monocarboxylic acid present. The undissolved dicarboxylic acids were filtered warm. They can be separated and/or converted to the diquinones as described in Example 1.

By substituting chloro- or polychloro-phthalic anhydrides for phthalic anhydride in the examples described above the corresponding chlorinated derivatives of the di(ortho-carboxybenzoyl) pyrenes and of the diquinones derived therefrom are obtained.

The yield of dicarboxylic acids obtainable by the processes described in the above examples is about 80% of the weight of pyrene used. About ⅔ consist of the compound II and ⅓ of the compound I. Over 95% of the acids are converted to the diquinones by the treatment with an acid condensing agent.

I claim:

1. A process for the production of a di(ortho-carboxybenzoyl) pyrene which comprises heating pyrene with at least two molecular proportions of phthalic anhydride in an inert solvent and in the presence of aluminium chloride at a temperature between 50 and 100° C.

2. A process as claimed in claim 1 in which the resulting condensation product consisting of a mixture of two isomers of di(ortho-carboxybenzoyl) pyrene is after separation from the aluminium chloride, solvent and any monocarboxylic acid present, separated to recover each of the isomers.

3. A process as claimed in claim 2 in which the separation of the mixture of the said two isomers is effected by crystallisation from an aqueous sodium hydroxide solution.

4. A process for the production of a di(ortho-carboxybenzoyl) pyrene, which comprises heating pyrene with at least two molecular proportions of phthalic anhydride in an inert solvent and in the presence of aluminium chloride at a temperature between 50 and 100° C. to yield a di(ortho-carboxybenzoyl) pyrene and treating the latter with an acid condensing agent to effect ring closure.

5. A process for the production of a derivative of a di(ortho-carboxybenzoyl) pyrene substituted in the benzene nuclei by halogens, which comprises heating pyrene with at least two molecular proportions of phthalic anhydride substituted in the nucleus by a halogen in an inert solvent and in the presence of aluminium chloride at a temperature between 50 and 100° C.

6. A process for the production of a diphthaloyl pyrene substituted in the benzene nuclei by halogens, which comprises heating pyrene with at least two molecular proportions of phthalic anhydride substituted in the nucleus by a halogen in an inert solvent and in the presence of aluminium chloride at a temperature between 50 and 100° C. to yield a halogen derivative of di(ortho-carboxybenzoyl) pyrene and treating the latter with an acid condensing agent to effect ring closure.

7. The process which comprises heating pyrene with at least two molecular proportions of a phthalic anhydride, which is nuclear-substituted with chlorine, with an inert organic solvent and in the presence of aluminum chloride at a temperature of from about 50° to 100° C., and recovering the resulting chlorine-substituted di(ortho-carboxybenzoyl) pyrene from the reaction products.

8. The process of claim 7 followed by heating said chlorine-substituted di(ortho-carboxybenzoyl) pyrene with an acid condensing agent to effect ring closure.

9. The process of claim 1 wherein the inert solvent employed is tetrachlorethane.

10. The process of claim 1 wherein the inert solvent employed is trichlorbenzene.

11. A new di(ortho-carboxybenzoyl) pyrene having the formula:

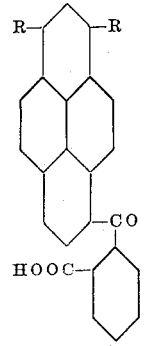

wherein one of the R substituents represents o-carboxybenzoyl while the other R represents hydrogen.

12. A new product consisting of a di(ortho-carboxybenzoyl) pyrene.

ERIC CLAR.

REFERENCES CITED

The following references are of record in the file of this patent:

UNITED STATES PATENTS

| Number | Name | Date |
|---|---|---|
| 1,845,751 | Jaeger | Feb. 16, 1932 |
| 2,225,088 | Tinker et al. | Dec. 17, 1940 |

FOREIGN PATENTS

| Number | Country | Date |
|---|---|---|
| 589,145 | Germany | Dec. 2, 1933 |

OTHER REFERENCES

Cook et al.: Chem. Abstracts, vol. 27, p. 3212 (1933).

Clar: Ber. Deut. Chem., vol. 69B, pp. 1671–1685 (1936).

Vollman et al.; Chem. Abstracts, vol. 32, col. 150 (1938).